United States Patent
Masini et al.

(10) Patent No.: US 9,514,498 B2
(45) Date of Patent: Dec. 6, 2016

(54) METHOD AND SYSTEM FOR CENTRALIZED RESERVATION CONTEXT MANAGEMENT ON MULTI-SERVER RESERVATION SYSTEM

(75) Inventors: Vincent Masini, Mougins (FR); Marc Pavot, Biot (FR); Dietmar Fauser, Grasse (FR); Jerome Daniel, Grasse (FR)

(73) Assignee: AMADEUS S.A.S., Biot (FR)

( * ) Notice: Subject to any disclaimer, the term of this patent is extended or adjusted under 35 U.S.C. 154(b) by 190 days.

(21) Appl. No.: 13/084,251

(22) Filed: Apr. 11, 2011

(65) Prior Publication Data

US 2012/0239724 A1   Sep. 20, 2012

(30) Foreign Application Priority Data

Mar. 15, 2011   (EP) .................................. 11305277

(51) Int. Cl.
G06F 15/16   (2006.01)
G06Q 50/14   (2012.01)
G06Q 10/06   (2012.01)

(52) U.S. Cl.
CPC .............. G06Q 50/14 (2013.01); G06Q 10/06 (2013.01)

(58) Field of Classification Search
CPC ........... H04L 12/1407; H04L 65/1016; H04L 67/1095; H04L 12/1403; H04L 2012/6443; H04L 29/12188; H04L 41/082; H04L 61/1588; H04L 67/306; H04L 65/1069; H04L 65/1073; H04L 67/26; H04L 29/06183
USPC ................ 709/201, 202, 205, 216, 219, 249
See application file for complete search history.

(56) References Cited

U.S. PATENT DOCUMENTS

| 5,495,606 A | 2/1996 | Borden et al. |
| 5,822,747 A | 10/1998 | Graefe et al. |

(Continued)

FOREIGN PATENT DOCUMENTS

| CN | 101187946 A | 5/2008 |
| CN | 101689197 | 3/2010 |

(Continued)

OTHER PUBLICATIONS

USPTO, Office Action issued in related U.S. Appl. No. 13/113,008 dated Sep. 19, 2012.

(Continued)

*Primary Examiner* — Brian J Gillis
*Assistant Examiner* — Thao Duong
(74) *Attorney, Agent, or Firm* — Thompson Hine LLP

(57) ABSTRACT

The method and system according to a preferred embodiment of the present invention allows ensuring consistency of the PNR record when it is handled within the subsystem controlled by the reservation interceptor module and including a plurality of OBEs. According to a preferred embodiment of the present invention the PNR context on open systems is centralized to avoid its fragmentation in the distributed environment, as gathering of all the context parts implies performance issues. In addition, instead of implementing a transaction session protocol to handle a start of transaction, intermediate updates and a final commit or rollback on the PNR context, the principle of the service interceptor architecture is to delegate the functional queries with the current user PNR context which will be modified in the central repository of PNR context only at response time when the whole functional use-case is finished.

17 Claims, 4 Drawing Sheets

(56) References Cited

U.S. PATENT DOCUMENTS

| | | | |
|---|---|---|---|
| 6,208,955 B1* | 3/2001 | Provan et al. | 703/20 |
| 6,392,997 B1* | 5/2002 | Chen | 370/252 |
| 7,437,408 B2 | 10/2008 | Schwartz et al. | |
| 7,454,462 B2 | 11/2008 | Belfiore et al. | |
| 7,454,761 B1 | 11/2008 | Roberts et al. | |
| 7,512,652 B1 | 3/2009 | Appelman et al. | |
| 7,778,962 B2 | 8/2010 | Shah et al. | |
| 7,809,593 B2 | 10/2010 | Daouk et al. | |
| 7,890,461 B2 | 2/2011 | Oeda et al. | |
| 7,925,624 B2 | 4/2011 | Vosshall et al. | |
| 2002/0078150 A1 | 6/2002 | Thompson et al. | |
| 2002/0143933 A1 | 10/2002 | Hind et al. | |
| 2003/0004760 A1 | 1/2003 | Schiff et al. | |
| 2003/0023715 A1 | 1/2003 | Reiner et al. | |
| 2003/0097285 A1* | 5/2003 | Ghaniem | 705/5 |
| 2003/0177044 A1* | 9/2003 | Sokel et al. | 705/5 |
| 2003/0195959 A1 | 10/2003 | Labadie et al. | |
| 2003/0200194 A1 | 10/2003 | Arnold et al. | |
| 2003/0220966 A1 | 11/2003 | Hepper et al. | |
| 2003/0225888 A1 | 12/2003 | Wason | |
| 2003/0233473 A1 | 12/2003 | Bonhomme et al. | |
| 2004/0006625 A1 | 1/2004 | Saha et al. | |
| 2004/0006711 A1 | 1/2004 | Krishnaswamy et al. | |
| 2004/0039745 A1 | 2/2004 | Evans et al. | |
| 2004/0078251 A1 | 4/2004 | DeMarcken | |
| 2004/0267623 A1 | 12/2004 | Vivadelli et al. | |
| 2005/0008163 A1 | 1/2005 | Leser et al. | |
| 2005/0026103 A1 | 2/2005 | Wasylucha | |
| 2005/0108069 A1 | 5/2005 | Shiran et al. | |
| 2005/0108298 A1 | 5/2005 | Iyengar et al. | |
| 2005/0262100 A1 | 11/2005 | Piper | |
| 2005/0288973 A1* | 12/2005 | Taylor et al. | 705/5 |
| 2006/0155857 A1 | 7/2006 | Feenan, Jr. et al. | |
| 2006/0212583 A1 | 9/2006 | Beadle et al. | |
| 2007/0110010 A1 | 5/2007 | Kotola et al. | |
| 2007/0192492 A1 | 8/2007 | Okazaki | |
| 2007/0220027 A1* | 9/2007 | Richey et al. | 707/101 |
| 2007/0234417 A1 | 10/2007 | Blakley, III et al. | |
| 2007/0239671 A1 | 10/2007 | Whitman et al. | |
| 2008/0028084 A1 | 1/2008 | Bloching et al. | |
| 2008/0091480 A1 | 4/2008 | Geoghegan et al. | |
| 2008/0126567 A1* | 5/2008 | Wilson | 709/248 |
| 2008/0167906 A1 | 7/2008 | De Marcken | |
| 2008/0262878 A1 | 10/2008 | Webby et al. | |
| 2008/0288644 A1 | 11/2008 | Gilfix et al. | |
| 2009/0006167 A1 | 1/2009 | Toussaint et al. | |
| 2009/0019118 A1 | 1/2009 | Jones et al. | |
| 2009/0083393 A1 | 3/2009 | Mizukami | |
| 2009/0172201 A1 | 7/2009 | Carmel | |
| 2009/0234682 A1 | 9/2009 | Baggett et al. | |
| 2009/0320073 A1 | 12/2009 | Reisman | |
| 2010/0064349 A1 | 3/2010 | Randle et al. | |
| 2010/0220604 A1 | 9/2010 | Skog et al. | |
| 2010/0251327 A1 | 9/2010 | Channabasavaiah et al. | |
| 2010/0287541 A1 | 11/2010 | Saunders et al. | |
| 2010/0316064 A1 | 12/2010 | Riley et al. | |
| 2011/0029336 A1 | 2/2011 | Vieillard-Baron et al. | |
| 2011/0082942 A1 | 4/2011 | Takei et al. | |
| 2011/0116461 A1 | 5/2011 | Holt et al. | |
| 2011/0149951 A1 | 6/2011 | Qiu et al. | |
| 2011/0196824 A1* | 8/2011 | Maes | 707/610 |
| 2011/0200054 A1 | 8/2011 | Craig et al. | |
| 2011/0202956 A1 | 8/2011 | Connelly et al. | |
| 2011/0283110 A1 | 11/2011 | Dapkus et al. | |
| 2011/0295996 A1 | 12/2011 | Qiu et al. | |
| 2012/0005320 A1 | 1/2012 | Sheth et al. | |
| 2012/0042060 A1 | 2/2012 | Jackowski et al. | |
| 2012/0069983 A1 | 3/2012 | Sall | |
| 2012/0131212 A1 | 5/2012 | Tang et al. | |
| 2012/0158642 A1* | 6/2012 | Ebrahimi | G06F 8/30 707/600 |
| 2012/0158756 A1* | 6/2012 | Jimenez | G06F 17/30949 707/754 |
| 2012/0163571 A1 | 6/2012 | Brunson et al. | |
| 2012/0173736 A1 | 7/2012 | Klein | |
| 2012/0184254 A1 | 7/2012 | Li et al. | |
| 2012/0239620 A1 | 9/2012 | Masini et al. | |
| 2012/0239818 A1 | 9/2012 | Defayet et al. | |
| 2012/0284062 A1 | 11/2012 | Aubry et al. | |

FOREIGN PATENT DOCUMENTS

| | | |
|---|---|---|
| EP | 2 259 217 A1 | 12/2010 |
| EP | 2259327 A2 | 12/2010 |
| JP | 2002-018635 | 10/1981 |
| JP | 2008-152553 | 3/2008 |
| KR | 102005006383 | 1/2005 |
| WO | 91/04532 | 4/1991 |
| WO | WO 98/32064 A2 | 7/1998 |
| WO | 9960478 A1 | 11/1999 |
| WO | WO 00/63808 A1 | 10/2000 |
| WO | 0219105 A1 | 3/2002 |
| WO | 0229640 A1 | 4/2002 |
| WO | 2008086146 A2 | 7/2008 |

OTHER PUBLICATIONS

European Search Report for European Application No. 11 30 5280 (Oct. 20, 2011).

European Search Report for European Patent Application No. 11305518 (Sep. 15, 2011).

European Search Report for European Application No. 11 30 5281 (Aug. 12, 2011).

European Search Report for European Application No. 11 30 5277 (Aug. 10, 2011).

Commonly-assigned, co-pending U.S. Appl. No. 13/185,417 for "Method and System for a Pre-Shopping Reservation System with Increased Search Efficiency," (Unpublished, Filed Jul. 18, 2011).

European Search Report for European application No. 11305278.1 (Jul. 5, 2011).

Commonly-assigned, co-pending U.S. Appl. No. 13/113,008 for "Method and System for an Improved Reservation System Optimizing Repeated Search Requests," (Unpublished, Filed May 20, 2011).

Commonly-assigned, co-pending U.S. Appl. No. 13/084,512 for "Method and System for Synchronization Mechanism on Multi-Server Reservation System," (Unpublished, Filed Apr. 11, 2011).

Commonly-assigned, co-pending U.S. Appl. No. 13/065,312 for "Method and System for Providing a Session Involving a Plurality of Software Applications," (Unpublished, Filed Mar. 18, 2011).

Commonly-assigned, co-pending U.S. Appl. No. 13/065,273 for "Method and System for Providing a Session in a Heterogeneous Environment," (Unpublished, Filed Mar. 18, 2011).

Screenshot of Kayak's Home Page, http://www.kayak.com/news/kayak-adds-map-based-search-tool-to-popular-ipad-app.bd.html, p. 1 (Copyright 2011).

Screenshot of Opodo's Home Page, http://promos.opodo.co.uk/airtools/ escape_map.html, pp. 1-2 (Copyright 2011).

Screenshot of Lufthansa's Trip Finder Home Page, http://www.lufthansa.com/online/portal/lh/us/nonav/local?nodeid=3322431&l=en, p. 1 (Downloaded from the Internet Jul. 18, 2011).

Screenshot of TravelTainment's Home Page, http://www.traveltainment.fr/a-propos-de-traveltainment/qui-sommes-nous/, p. 1 (Copyright 2010).

Keen et al., "Patterns: SOA Foundation—Business Process Management Scenario," Sections 2.2, 2.3, 5.1-5.3, 7.1-7.4, ibm.com/redbooks, pp. 1-523 (Aug. 1, 2006).

"WebSphere Application Server V6 Scalability and Performance Handbook," IBM, pp. 1-370 (May 1, 2005).

Sadtler et al., "Patterns: Broker Interactions for Intra- and Inter-enterprise," Sections 3.3-3.5, 4.1-4.3, 5.1-5.3, 6.1-6.3, 9.1-9.6, ibm.com/redbooks, pp. 1-303 (Jan. 1, 2004).

"WebSphere® Edge Server for Multiplatforms: Getting Started," Version 2.0, IBM, pp. 1-119 (Dec. 1, 2001).

USPTO, Notice of Allowance issued in related U.S. Appl. No. 13/065,312 dated Jan. 18, 2013.

USPTO, Office Action issued in related U.S. Appl. No. 13/084,512 dated Sep. 7, 2012.

(56) References Cited

OTHER PUBLICATIONS

European Search Report for European Application No. 11 30 5813 dated Nov. 10, 2011.
USPTO, Office Action issued in related U.S. Appl. No. 13/185,417 dated Nov. 6, 2012.
European Patent Office, extended European search report issued in related European application No. 11305280.7 dated Jan. 17, 2012.
Le Hien Luu, Notice of Allowance issued in related U.S. Appl. No. 13/065,312 dated Oct. 2, 2012.
USPTO, Office Action issued in U.S. Appl. No. 13/084,512 dated May 22, 2013.
USPTO, Office Action issued in U.S. Appl. No. 13/084,512 dated Jun. 16, 2014.
USPTO, Office Action issued in U.S. Appl. No. 13/084,512 dated Feb. 26, 2015.
JP, Notification of Reasons for Refusal (English translation); Patent Application No. 2013-558327 (Apr. 28, 2015).
State Intellectual Property Office of China, Second Office Action issued in application No. 201280011806.x Jul. 1, 2016.
USPTO, Office Action issued in U.S. Appl. No. 13/084,512 Jul. 8, 2016.
USPTO, Notice of Allowance issued in U.S. Appl. No. 13/065,273 May 10, 2013.
USPTO, Office Action issued in U.S. Appl. No. 13/065,273 Apr. 25, 2013.
State Intellectual Property Office of the People's Republic of China, Office Action issued in corresponding Application No. 201280011806.X, dated Dec. 22, 2015.
U.S. Patent and Trademark Office, Office Action issued in corresponding U.S. Appl. No. 13/084,512 dated Dec. 11, 2015.
CN, First Office Action and Search Report; Chinese Patent Application No. 201280011805.5 (Feb. 26, 2016).

* cited by examiner

METHOD AND SYSTEM FOR CENTRALIZED RESERVATION CONTEXT MANAGEMENT ON MULTI-SERVER RESERVATION SYSTEM

PRIORITY CLAIM

This application claims the benefit of European Patent Application No. 11305277.3 filed Mar. 15, 2011, the disclosure of which is incorporated herein by reference.

FIELD OF THE INVENTION

The present invention relates to the field of travel reservation systems, more particularly to a method and system for a centralized reservation context management on multiple servers using a reservation service interceptor architecture.

BACKGROUND OF THE INVENTION

Modern travel companies (e.g. airlines) usually employ sophisticated applications for handling reservation requests by customers. It is more and more frequent the case where more than one architecture is used throughout the company system. In such cases compatibility and synchronization issues should be taken into account when designing and planning the reservation system. An example is when part of the reservation management is performed on Internet based applications or communication infrastructures. Another example is when a system (not necessarily a reservation system) must be migrated from a legacy mainframe system (e.g. TPF) to a new system (e.g. an open system). To avoid service interruption in the reservation system, it is advisable to perform this migration progressively, instead of closing down the existing system and switching to the new one in one single move, with all the possible problems which could arise: in addition to the complexity of a big activation procedure at the time of the switch between the old and new system, we should also consider the need of double maintenance of software on both, while the new system is under construction and the old one continues to evolve. Maybe new functionalities must be developed and this requires a double effort, while, if the two systems can work together, all development effort can be dedicated to the new platform. For these reasons, a progressive migration is preferable to a so called "big bang" migration strategy, however some difficulties must be considered. In particular, when the reservation services are distributed between two different platforms (e.g. mainframe and open platforms) they require sharing the same Passenger Name Record (PNR) contextual data in read and write mode to perform their business functionalities.

One of the issues to be considered is the synchronization of data (e.g. PNR data) which are shared in read and write mode across different servers and platforms and across protocols of communication (e.g. TPF mainframe and open systems) so that the systems can share the same up-to-date PNR context data. Co-pending US patent application (claiming priority of EP 11305278.1) "METHOD AND SYSTEM FOR SYNCHRONIZATION MECHANISM ON MULTI-SERVER RESERVATION SYSTEM" filed by the same applicant and having same priority date as the present application, addresses the problem of synchronization across multiple servers (or platform). The method disclosed in such application allows synchronizing the PNR values across the multiplatform system with an efficient and consistent mechanism. The mechanism addresses the consistency and performance issues thanks to its versioning and its lazy behaviour (the synchronization occurs only when required). It can be used as a solution during a migration phase from one system to another with progressive migration of applications sharing data, and also as a permanent solution for distributed applications across different platforms.

The synchronization is performed only when it is needed, and provides only the updates to be done on the local context copy. A key element of the above method is a mechanism to ensure that the most up to date value of a shared parameter is used at any time during the process. In the method and system according to the invention above a distributed shared context correlator is used.

This is called DCX (Distributed context correlator). DCX conveys additional information on top of each message coming from the same user session, on all types of communication protocols to represent the distribution of the applicative contexts on the different platforms and applications, also referred to as machines or application servers.

This DCX entity is created and stored on an Enterprise Service Bus (ESB), which connects the various servers, and is conveyed on all messages within the Amadeus infrastructure in the session header. It contains references to contexts on the different platforms, meaning it does not contain the context data themselves. It is formatted in XML and composed of 3 parts; one reserved for ESB context information used for routing and other use-cases, another part is dedicated to security and user authentication, and finally the third part is the applicative part where application can add their context references and status indicators associated to them. It is in the applicative part that the Context Synchronization process stores the information related to the distributed PNR contexts, and it is the basis of the mechanism.

The DCX offers two other features required for the synchronization mechanism which are the affinity and the context sharing between different communication protocols. The affinity is required to target the exact same application server each time the same service is invoked and it is needed as the PNR contexts are local to application servers. Preferably, the information related to affinity is comprised in keys, which can be referred to as "Affinity Keys", said keys being comprised in the DCX. The sharing of context information across protocols is required to ensure that a user invoking PNR services on different protocols will still be working on the exact same PNR context.

The lifetime duration of the context is controlled by the established conversations between the ESB and the open system (or the mainframe). The DCX offers a global view of the user activity meaning that if the user works through one specific conversation (for instance EDIFACT conversation), the other protocol conversations will be maintained to ensure consistency across protocols. When the user disconnects from the ESB (by a specific close of conversation or by an inactivity timeout), the conversations to the open systems and mainframe will be also closed and will trigger the clean-up of the contexts. A description of DCX is also available in co-pending applications U.S. Ser. No. 13/065,312 "METHOD AND SYSTEM FOR PROVIDING A SESSION INVOLVING A PLURALITY OF SOFTWARE APPLICATIONS" and U.S. Ser. No. 13/065,273 "METHOD AND SYSTEM FOR PROVIDING A SESSION IN A HETEROGENEOUS ENVIRONMENT" filed by the same applicant and having same priority date of the present application.

While the synchronization mechanism based on DCX is very advantageous in terms of reservation data sharing when implementing a system across multiple platforms, in some cases, e.g. when information are handled and exchanged within a highly distributed Open Back-End platform, it might be preferable to have a centralized handling of the reservation data which could improve the context handling. On a highly distributed environment the synchronization mechanism would imply that all servers are critical (since they all store locally in memory the reservation data) and hey all have to get data from the other servers and this could have impact on the system performances.

OBJECT OF THE INVENTION

An object of the present invention is to alleviate at least some of the problems associated with the prior art systems and provide an improved handling of PNR data when information are handled and exchanged within the same distributed environment.

According to one aspect of the present invention there is provided a reservation method operating in a distributed reservation system including a plurality of Open Back End servers (OBE), each OBE being adapted for providing a service, for controlling consistency of PNR record during a user transaction across at least two OBEs, the method including the steps of: a reservation interceptor module, receiving a user request comprising a data structure including the request for at least one service and reference to a PNR record; the reservation interceptor module enriching the data structure with information including the content of PNR record; the reservation interceptor module forwarding the enriched data structure to a first at least one OBE according to the at least one service requested in the user request; responsive to the first at least one OBE returning an up to date version of the enriched data structure, the reservation interceptor module forwarding the enriched data structure in turn to other OBEs until all requested services included in the user request have been provided; returning a response associated to the at least one service requested by the user.

The method according to a preferred embodiment of the present invention allows ensuring consistency of the PNR record when it is handled within the subsystem controlled by the reservation interceptor module and including a plurality of OBEs. Improvement in the security of the system is also obtained. With the method of the present invention we only need to protect the server holding the central reservation data (via a backup for instance), and the different servers requiring the reservation data to process the user requests will have seamlessly access to these data embedded within the queries so that no additional collateral exchanges are necessary.

According to a second aspect of the present invention there is provided a reservation sub-system comprising one or more components adapted to perform the method described above.

According to a further embodiment of the present invention there is provided a computer program comprising instructions for carrying out the method described above when said computer program is executed on a computer system.

BRIEF DESCRIPTION OF DRAWINGS

Reference will now be made, by way of example, to the accompanying drawings, in which.

DETAILED DESCRIPTION OF THE EMBODIMENTS

Figure 1:
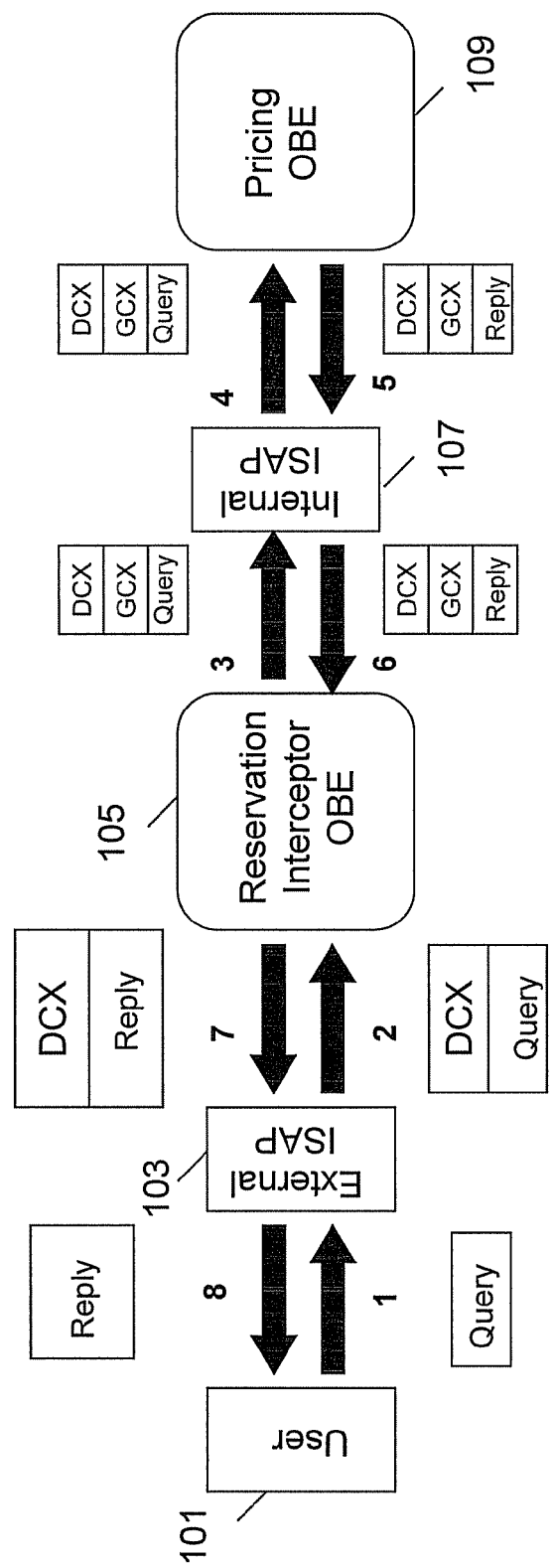
FIG. 1 is a diagram of a system according to an embodiment of the present invention.

As shown in FIG. 1 the PNR context on open systems is centralized to avoid its fragmentation in the distributed environment, as gathering of all the context parts implies performance issues. In addition, instead of implementing a transaction session protocol to handle a start of transaction, intermediate updates and a final commit or rollback on the PNR context, the principle of the service interceptor architecture is to delegate the functional queries with the current user PNR context which will be modified in the central repository of PNR context only at response time when the whole functional use-case is finished. Such centralization is only limited to the reservation data that are shared between all the reservation servers and the PNR context is conveyed in an entity called GCX (Generic Context Container) which is not a persistent data structure. Once the reply is provided to the user there is no need to maintain the GCX anymore.

FIG. 1 represents a possible implementation of a system according to a preferred embodiment of the present invention. Functional components are shown together with the data structures (DCX and GCX); the communication steps of a possible service request by a user are indicated with numerals 1-8 in the Figure. The example is built according to an Amadeus infrastructure, e.g. Amadeus Reservation Service Interceptor. A user 101 is connected with the reservation system by means e.g. of a computer as explained with reference to FIG. 1. All functional queries of services which require accessing the user PNR context in read or write mode have to go through a Reservation Service Interceptor OBE 105 (also called Reservation Interceptor) so that the queries can be enriched with a GCX entity containing the PNR context data. Then the queries are delegated to the real functional services in order to perform the business request. The context updates are provided by the functional services in a GCX which is conveyed with the functional reply. The replies go through the reservation service interceptor again, which integrates the updates into the user PNR context, removes the GCX and forwards the functional reply to the user.

In this architecture 2 kinds of ISAPs (Integration Service Access Points) are used: external ISAP 103 for external users and internal ISAP 107 for internal services and applications calling other services. ISAP are entities of the ESB which allow users or applications to target services without necessarily knowing the details of the service topology. According to the embodiment described in the present example, a DCX entity is created and stored on the external ISAP 103 where the external user is connected to. It is added on top of the user query and is conveyed on all messages within Amadeus infrastructure. Both the DCX and GCX entities can go through the internal ISAPs which allow such entities in queries and replies and does not store them in their context.

The functional services are published on the external ISAPs using the route of the reservation service interceptor, to make them go through the interceptor first. The same functional services are also published on the unique internal ISAP behind the service interceptor using the real routes to the functional open systems, so that the business requests can be processed. This way the routing is still handled by the ESB without duplication of routing logic within the service interceptor, which only takes care of PNR context attachment or removal.

As the DCX and GCX entities are at protocol level the functional client applications do not see these entities which are automatically removed and kept aside by the communication middleware. A delegation interface is delivered to the functional client applications to access the PNR data from the GCX as if the context was locally stored. The functional service interfaces are not impacted by the DCX or GCX, since they are not part of the message grammar. In such case, the access to the user PNR context is seamless for the server application as it does not require sending a query to get the context.

In responses the functional server applications can provide PNR context updates as well as actions to be performed on the service interceptor. Currently the possible actions are to simply forward the functional reply to the user, or to reply to the user with a PNR display, which requires a new client call from the interceptor to the PNR display service, and/or request to be notified upon pre-defined events such as ignore the user PNR context.

In this example, the user 101 sends a request for a pricing service (step 1). The query is received through External ISAP 103 which retrieves the most up to date DCX as explained above and passes (step 2) the DCX information to Reservation Interceptor OBE 105 together with the user query. The Reservation Interceptor OBE, accesses the centralized PNR context for this user (in this scenario it is up-to-date on open systems) and adds it in the GCX on top of the functional request. The complete data structure (DCX+GCX+Query) is then forwarded to the Pricing OBE 109 hosting the pricing functionalities, through Internal ISAP 107 (steps 3 and 4). Once the business process has been performed, the pricing OBE 109 replies with context updates (5 and 6 again through Internal ISAP 107) to Reservation Interceptor 105 which will take care of replying to the user 101 (7 and 8) through External ISAP 103 The context updates in the reply are integrated into the centralized PNR context by the interceptor and the reply is forwarded to the user. The mechanism works for remote open systems offering functional services and also for local services directly offered by the reservation open system.

Figure 2:
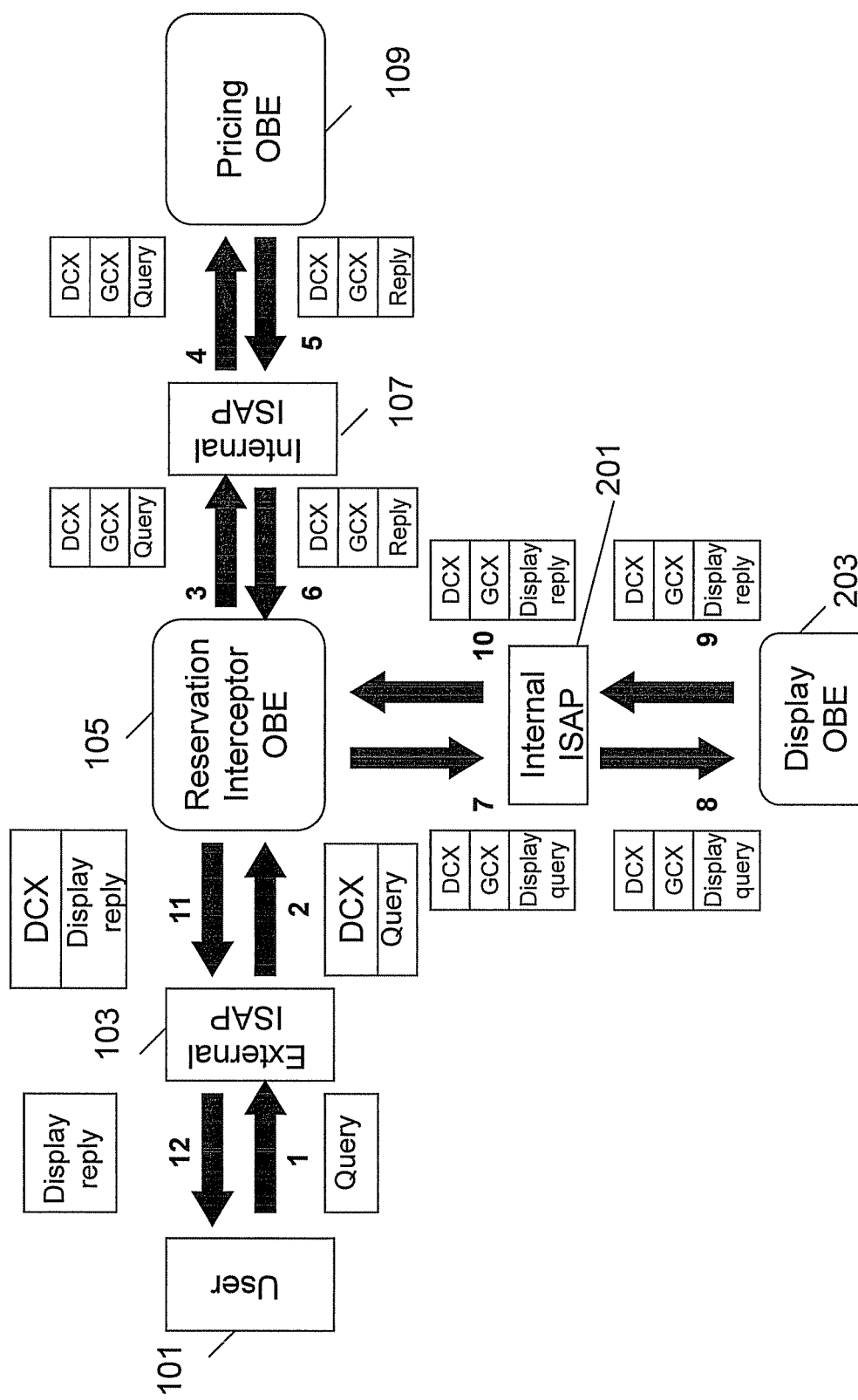
FIG. 2 is a diagram of a system according to another embodiment of the present invention.

The example shown in FIG. 1 is deliberately very simple for ease of description, however those skilled in the art will appreciate that several service OBEs can be arranged and controlled by the same Reservation Interceptor OBE 105. The user PNR stored on the GCX will be passed from one step to the next ensuring that it is always up to date: only when the session is terminated, the PNR is returned to the user and the temporary data structure of GCX can be abandoned and deleted. FIG. 2 shows a more complete example with two service OBEs working within the infrastructure of the Reservation Interceptor 105. In this example, the user 101 sends a request for a pricing service through External ISAP 103 which retrieves the most up to date DCX as explained above and passes (step 2) the DCX information to Reservation Interceptor OBE 105 together with the user query. The Reservation Interceptor OBE accesses the centralized PNR context for this user and adds it in the GCX on top of the functional request. The complete data structure (DCX+GCX+Query) is the forwarded to the Pricing OBE 109 hosting the pricing functionalities, through Internal ISAP 107 (steps 3 and 4). Once the business process has been performed, the pricing OBE 109 replies with context updates (5 and 6 again through Internal ISAP 107) to Reservation Interceptor 105. In this case the Reservation Interceptor 105 will then call the display service to format the reply for the user through another Internal ISAP 201 (steps 7 and 8) which sends the query to a Display OBE 203. Again the same delegation pattern is used in such case to ensure the display service has access to the correct PNR data to format the associated display. Once this is done, the context updates in the reply are sent back to Reservation interceptor 105 (steps 9 and 10) and integrated into the centralized PNR context by the interceptor and the display reply is forwarded to the user 101 through External ISAP 103 (steps 11 and 12). The mechanism works for remote open systems offering functional services and also for local services directly offered by the reservation open system. When the query message leaves the subsystem, i.e. it is communicated to outside by the Reservation Interceptor 105, the GCX ends its function and it is deleted. The consistency of the PNR information is then ensured by the fact that the updates are integrated within the centralized context only on the final response to the user service request which represents a consistent set of updates corresponding to the whole chain of service calls. The reply provided to the user is freed by all additional information (DCX and/or GCX) which are exchanged only within reservation system (e.g. Amadeus infrastructure).

The method according to a preferred embodiment of the present invention here described makes reference to a reservation system having a synchronization mechanism based on DCX (as also described in the above mentioned co-pending application). However those skilled in the art will appreciate that other infrastructures can be used instead without any limitation on how the synchronization among different platforms is ensured (if a synchronization is needed at all). The result of the method according the present invention is to realize a sort of sub-system where a reservation context corresponding to a user (e.g. a user PNR) is strictly controlled by the Reservation Interceptor module described above. The "range" of such control can be extended even to remote service providers (OBE) and the effect is that within such range, i.e. until the query is not communicated outside the sub-system, the PNR is always consistent and cannot be modified without the control of the Reservation Interceptor (which is an OBE itself). Several different system structures and complexity are possible, however the balance between safety/consistency of information and system performance must be taken into account. According to the presently discussed preferred embodiment, the object of the DCX (Distributed context correlator) is to convey additional information on top of each message coming from the same user session, on all types of communication protocols to represent the distribution of the applicative contexts on the different platforms and applications.

The function of the GCX (Generic context container) is to convey additional information on top of each messages coming from the same user session, on all types of communication protocols to represent the distribution of the applicative contexts on the different platforms and applications.

The GCX is only conveyed on one query, or on one reply, and contains the context data themselves instead of the references to them (as it is the case with DCX). It is not intended to convey context data on all the messages; this is why the GCX is not a persistent entity.

The GCX contains a set of pairs (key, value) so that several applications called subsequently can add their own context data on top of the ones already present. The GCX can be conveyed on both EDIFACT and XML messages, and it is located at the end of the message in order to ease the logging of message traces.

The reservation service interceptor receives the user functional queries such as pricing queries to enrich them with the latest user PNR context data. Thanks to the distributed context synchronization mechanism, the reservation interceptor retrieves the latest PNR context data from TPF if required, and attach them within a GCX before delegating the pricing query to the functional pricing OBE. When the process is performed by the functional service, the functional reply with associated PNR context updates are sent back to the reservation service interceptor. The service interceptor will remove and integrate the context updates within the user PNR context stored in-memory in the reservation OBE and forward the functional reply to the user.

The reservation service interceptor receives a functional query along with a DCX. It checks the DCX content and analyses with local PNR context information whether a synchronization with the TPF mainframe is required, using the distributed context synchronization mechanism. Once the latest PNR context data have been retrieved for the current user, the delegation library is used in order to encode the PNR context into a GCX entity. The service interceptor then delegates the functional query along with the DCX and GCX.

When the reservation service interceptor receives a functional reply, it uses the delegation library to decode the GCX that has been provided. From the GCX, the PNR context updates will be extracted in order to be integrated within the centralised user PNR context on the reservation OBE and the DCX keys will be updated accordingly (see distributed context synchronization mechanism for more details). From the GCX, the actions will also be extracted, and the reservation interceptor will perform them: for instance, previous diagrams show an action of simple forwarding of functional reply, so reservation interceptor will just reply to the user with the functional reply received.

The delegation mechanism is composed of both a client interface to call other services from an application and a server interface to allow other services calling this application as well.

In a preferred embodiment of the present invention, the delegation mechanism has been designed to answer several requirements which are the following:
Support for multi-platform delegations and easy evolution of structures (we can have different versions of delegation library on different OBEs, delegation message will be using forward compatible EDIFACT serialization of context data because it must be readable by an older version of grammar)
Support several types of contexts
Support several modes of delegations (full mode, delta mode)
Support several subsequent delegations, allowing a chain of applications delegating to each other part of functionality
Support context updates and post-processing actions in reply of delegation (actions can be to forward the functional reply or to request for a PNR display as a response for the user)
Support registering of functional applications in the reply of delegation to notify them upon events such as the ignore of the context Additionally it is possible to convey several contexts at the same time with the functional messages, thanks to the delegation data.

These requirements have a direct impact on the content of the context information that is conveyed in the GCX as we will see in the next section.

As far as the DCX mechanism is concerned, a complete description of its functionalities can be found in the co-pending application "METHOD AND SYSTEM FOR SYNCHRONIZATION MECHANISM ON MULTI-SERVER RESERVATION SYSTEM" filed by the same applicant and having same filing date as the present application. According to a preferred embodiment, a local in-memory copy of the PNR context is replicated on each platform; the updates are performed locally and the synchronization occurs when another platform needs to access the up-to-date context data. This is what we call distributed context synchronization. The complexity of the synchronization mechanism is to determine whether a local copy is out of date or not, and determine where is located the most up-to-date PNR data to get it. This mechanism works on all types of user queries whatever the protocol of communication and it is not dependent on the platform technical characteristics such as representation of data (big or little endian).

The present approach to PNR context synchronization answers all these requirements in an optimized way as the synchronization is performed only when it is needed, and provides only the updates to be done on the local context copy.

In the examples of the present invention description the connections among servers are realised by means of an ESB, however those skilled in the art will appreciate that any other state of the art routing means, capable to route a transaction to an appropriate application server, could be used instead, e.g. a Router, a Portal or a Request Broker.

Figure 3:
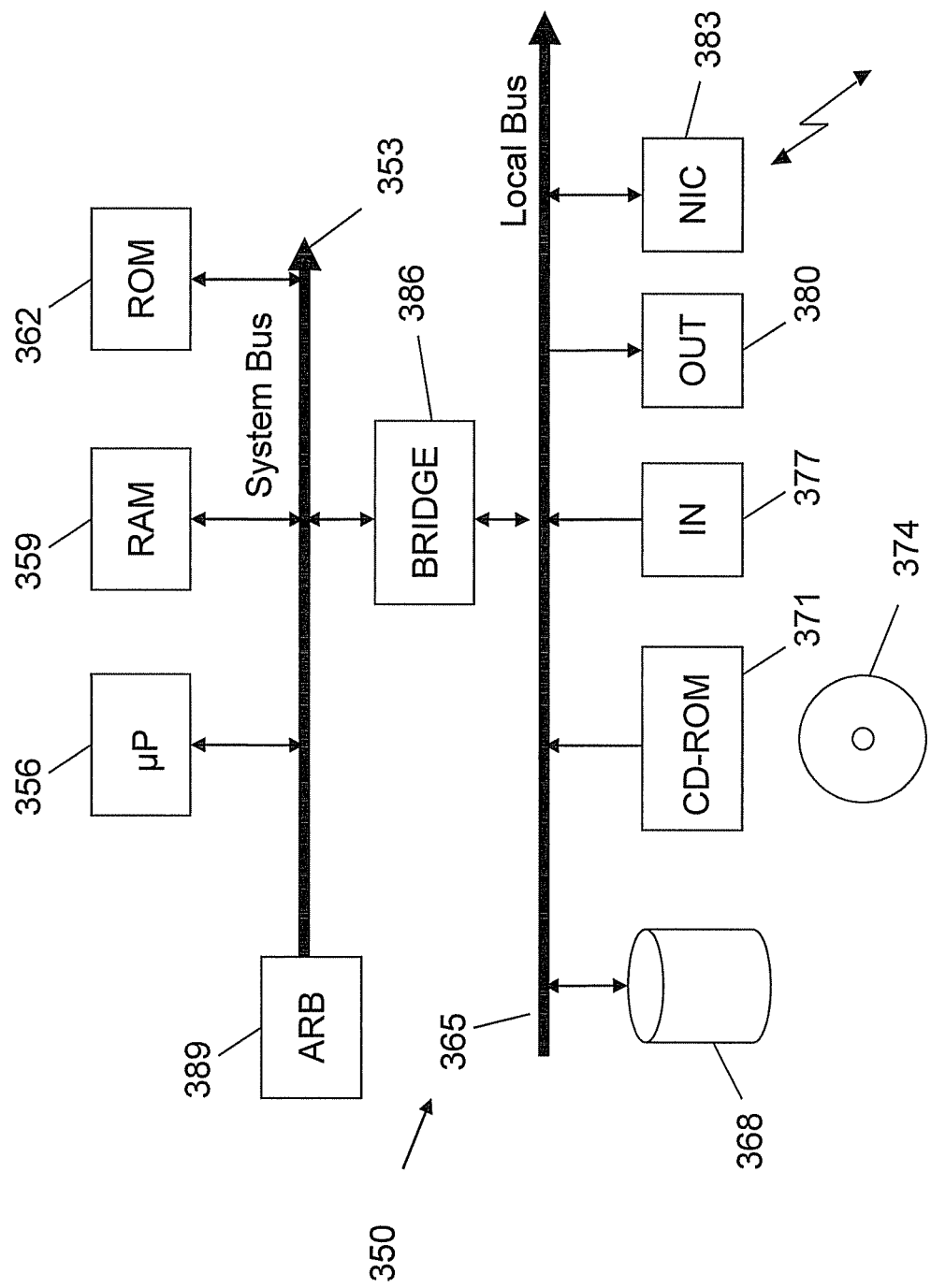
FIG. 3 is a diagram of a general computer system adapted to support the method of a preferred embodiment of the present invention.

With reference to FIG. 3 a generic computer of the system (e.g. any computer, Reservation server, TPF mainframe, Open System server, data base management subsystem, router, network server) is denoted with 350. The computer 350 is formed by several units that are connected in parallel to a system bus 353. In detail, one or more microprocessors 356 control operation of the computer 350; a RAM 359 is directly used as a working memory by the microprocessors 356, and a ROM 362 stores basic code for a bootstrap of the computer 350. Peripheral units are clustered around a local bus 365 (by means of respective interfaces). Particularly, a mass memory consists of a hard-disk 368 and a drive 371 for reading CD-ROMs 374. Moreover, the computer 350 includes input devices 377 (for example, a keyboard and a mouse), and output devices 380 (for example, a monitor and a printer). A Network Interface Card 383 is used to connect the computer 350 to the network. A bridge unit 386 interfaces the system bus 353 with the local bus 365. Each microprocessor 356 and the bridge unit 386 can operate as master agents requesting an access to the system bus 353 for transmitting information. An arbiter 389 manages the granting of the access with mutual exclusion to the system bus 353. Similar considerations apply if the system has a different topology, or it is based on other networks. Alternatively, the computers have a different structure, include equivalent units, or consist of other data processing entities (such as PDAs, mobile phones, and the like).

Figure 4:
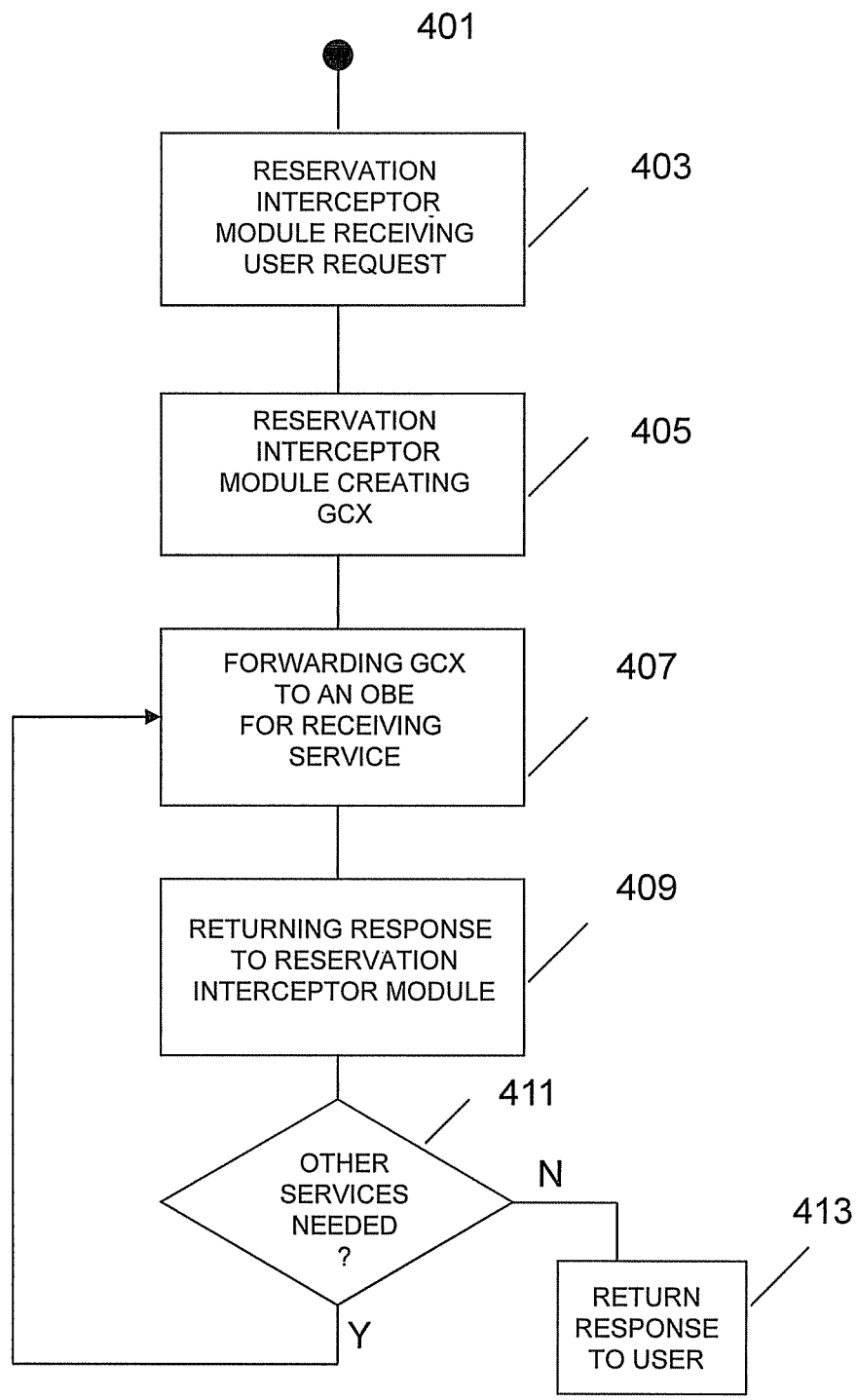
FIG. 4 is a flow chart of the method steps of a process, in accordance with one embodiment of the present invention.

The method of a preferred embodiment is also represented in the diagram shown in FIG. 4. The method operates on a distributed reservation system including a plurality of Open Back End servers (OBE), each OBE being adapted for providing a service, for controlling consistency of PNR record during a user transaction across at least two OBEs; the method begins at black circle 401 and then goes to box 403 where a user request is received at the Reservation Service Interceptor. At step 405 a structure is created enriching the data structure with the information of the user request, normally including the PNR (or similar data structure containing reservation information of the requesting user). Such structure (here called GCX) has been described with a certain level of details in the present application, however those skilled in the art will appreciate that several different implementations could be used instead. Just as an example the additional information could be built as a separate data structure which accompanies the user query and/or the PNR in the transactions among the OBEs. At step 407 the enriched data structure (including GCX) is then forwarded from the Reservation Interceptor to one of the OBEs to receive one of the requested services (as detailed in the user request). When the response is returned to the Reservation Interceptor (step 409), the Reservation Interceptor verifies whether other services are needed (step 411). If this is the case, the enriched data structure is forwarded to another OBEs and the process goes back to step 407. When all services requested by the user have been provided, the Reservation Interceptor returns to the user the response associated to the services that have been called by the user; a consistent PNR context associated to the user is maintained for future requests.

It will be appreciated that alterations and modifications may be made to the above without departing from the scope of the disclosure. Naturally, in order to satisfy local and specific requirements, a person skilled in the art may apply to the solution described above many modifications and alterations. Particularly, although the present disclosure has been described with a certain degree of particular with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

Similar considerations apply if the program (which may be used to implement each embodiment of the disclosure) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be preloaded), removable disks, tapes, cards, wires, fibres, wireless connections, networks, broadcast waves, and the like; for example, the medium may be of the electronic, magnetic, optical, electromagnetic, infrared, or semiconductor type.

In any case, the solution according to the present disclosure lends itself to be carried out with a hardware structure (for example, integrated in a chip of semiconductor material), or with a combination of software and hardware.

What is claimed is:

1. A method of processing a user query including a service request in a distributed reservation system including a plurality of servers, the method comprising:
    receiving an initial data structure at a first server of the plurality of servers, the initial data structure including the service request, a distributed context correlator that identifies a second server of the plurality of servers, and a reference to a passenger name record;
    receiving, at the first server, a content of the passenger name record from a centralized passenger name record context;
    enriching, at the first server, the initial data structure with a temporary data structure containing the content of the passenger name record to produce a complete data structure;
    forwarding the complete data structure from the first server to the second server identified by the distributed context correlator;
    performing, at the second server, the service request to generate a reply;
    updating, at the second server, the complete data structure to include the reply;
    after the complete data structure is updated to include the reply, returning the updated complete data structure from the second server to the first server;
    removing, at the first server, the temporary data structure from the updated complete data structure; and
    after the temporary data structure is removed, returning the reply from the first server to respond to the service request in the user query.

2. The method of claim 1 further comprising:
    in further response to the return of the complete data structure, updating, by the first server, the centralized passenger name record context based upon the reply in the complete data structure.

3. The method of claim 2 wherein updating the centralized passenger name record context comprises:
    modifying the passenger name record.

4. The method of claim 1 further comprising:
    receiving the user query at a first Integration Service Access Point; and
    in response to receiving the user query, transmitting the initial data structure from the first Integration Service Access Point to the first server.

5. The method of claim 4 further comprising:
    in response to receiving the user query at the first Integration Service Access Point, obtaining, at the Integration Service Access Point, a most up-to-date version of the passenger name record.

6. The method of claim 1 wherein the first server is communicatively coupled to each of the other servers of the plurality of servers though an Integration Service Access Point associated with the respective other servers.

7. The method of claim 1 wherein the plurality of servers of the distributed reservation system exchange information through a Service Oriented Architecture system.

8. The method of claim 1 further comprising:
    updating, at the second server, the content of the passenger name record in the temporary data structure; and
    updating, at the first server, the content of the passenger name record in the centralized passenger name record context based on the updated content of the passenger name record in the temporary data structure.

9. The method of claim 1 wherein the second server generates the reply based at least in part on the content of the passenger name record in the temporary data structure.

10. A computer program product comprising:

a non-transitory computer readable storage medium; and instructions stored on the non-transitory computer readable storage medium that, when executed on one or more servers of a distributed reservation system including a plurality of servers, cause the one or more servers to:

receive, at a first server of the plurality of servers, an initial data structure including a service request of a user query, a distributed context correlator that identifies a second server of the plurality of servers, and a reference to a passenger name record;

receive, at the first server, a content of the passenger name record from a centralized passenger name record context;

enrich, at the first server, the initial data structure with a temporary data structure containing the content of the passenger name record to produce a complete data structure;

forward the complete data structure from the first server to the second server identified by the distributed context correlator;

perform, at the second server, the service request to generate a reply;

update, at the second server, the complete data structure to include the reply;

after the complete data structure is updated to include the reply, return the updated complete data structure from the second server to the first server;

remove, at the first server, the temporary data structure from the updated complete data structure; and after the temporary data structure is removed, return the reply from the first server to respond to the service request in the user query.

11. A reservation system for processing a user query including a service request, the reservation system comprising:

a plurality of servers including a first server and a second server, the first server and the second server being configured to:

receive, at the first server, an initial data structure including the service request, a distributed context correlator that identifies the second server, and a reference to a passenger name record;

receive, at the first server, a content of the passenger name record from a centralized passenger name record context;

enrich, at the first server, the initial data structure with a temporary data structure containing the content of the passenger name record to produce a complete data structure;

forward the complete data structure from the first server to the second server identified by the distributed context correlator;

perform, at the second server, the service request to generate a reply;

update, at the second server, the complete data structure to include the reply;

after the complete data structure is updated to include the reply, return the updated complete data structure from the second server to the first server;

remove, at the first server, the temporary data structure from the updated complete data structure; and after the temporary data structure is removed, return the reply from the first server to respond to the service request in the user query.

12. The reservation system of claim 11 wherein first server and the second server are further configured to:

in further response to the return of the complete data structure, update, by the first server, the centralized passenger name record context based upon the reply in the complete data structure.

13. The reservation system of claim 12 wherein the centralized passenger name record context is updated by modifying the passenger name record.

14. The reservation system of claim 11 further comprising a first Integration Service Access Point configured to:

receive the user query; and in response to receiving the user query, transmit the initial data structure to the first server.

15. The reservation system of claim 14 wherein the Integration Service Access Point obtains a most up-to-date version of the passenger name record in response to receiving the user query.

16. The reservation system of claim 11 wherein the first server is communicatively coupled to each of the other servers of the plurality of servers though an Integration Service Access Point associated with the respective other servers.

17. The reservation system of claim 11 wherein the plurality of servers exchange information through a Service Oriented Architecture system.

* * * * *